Jan. 17, 1939.　　　　E. D. WILSON　　　　2,144,519
RADIANT ENERGY DETECTOR
Filed March 6, 1937
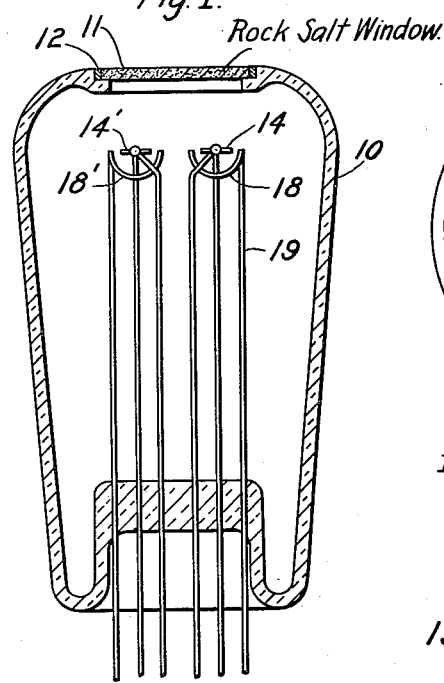
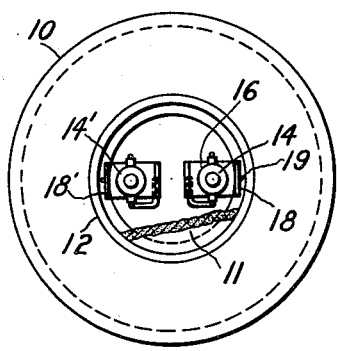
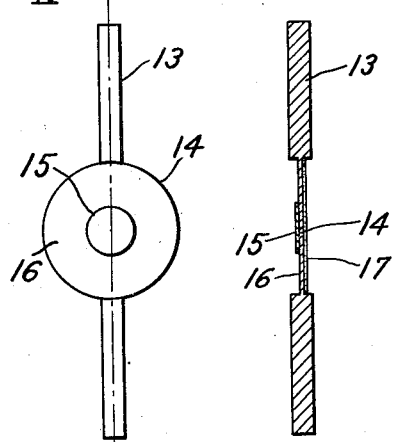
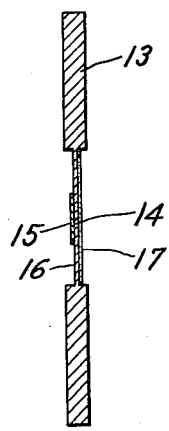
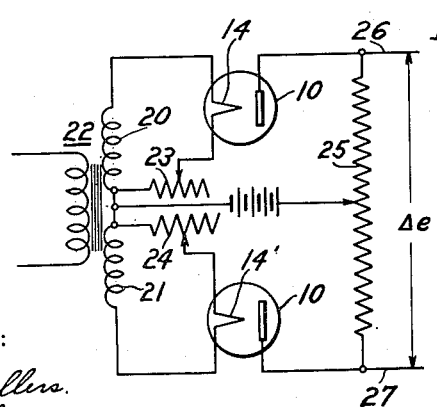
WITNESSES:
Wm. B. Sellers.
R W Bailey
INVENTOR
Earl D. Wilson.
BY F. W. Lyle
ATTORNEY Patented Jan. 17, 1939

2,144,519

UNITED STATES PATENT OFFICE 2,144,519

RADIANT ENERGY DETECTOR

Earl D. Wilson, Wilkinsburg, Pa., assignor to Westinghouse Electric & Manufacturing Company, East Pittsburgh, Pa., a corporation of Pennsylvania Application March 6, 1937, Serial No. 129,439

6 Claims. (Cl. 250—172)

My invention relates to radiant energy detectors and especially one for detecting and measuring infra-red radiations beyond two microns wavelength.

An object of the invention is to provide a radiant energy detector which will deliver a voltage several orders of magnitude greater than the devices heretofore utilized for such detection, namely, the thermo-couple and the bolometer.

Another object of my invention is to provide a radiant energy detector having a cathode providing a rapid change of electronic emission with temperature to detect or measure long wavelength radiations.

Other objects and advantages of my invention will become apparent from the following description and drawing, in which:

Figure 1 is a view, partly in elevation and partly in cross-section, of a tube incorporating my invention.

Fig. 2 is a top plan view with part of the window of the tube of Fig. 1 broken away.

Fig. 3 is an enlarged view of the cathode.

Fig. 4 is a cross-sectional view taken on lines IV—IV of Fig. 3; and

Fig. 5 is a diagrammatic circuit that is preferably applied to the tube disclosed in Fig. 1.

It is my purpose to make use of the rate of change of electronic emission of a thermionic element with temperature to detect or measure long wavelength radiations such as infra-red radiations beyond two microns. The rate of emission from a heated material is given by the well known fundamental law $$i = aT^2 e^{-\frac{b}{T}}$$

where $i$ is the electronic current, $T$ is the absolute temperature and $a$ and $b$ are constants for the material in question. From this the rate of change of emission with temperature is given by $$\frac{di}{dT} = a(2T+b)e^{-\frac{b}{T}}$$

For sensitivity $b$ should be as small as possible, i. e., the work function of the cathode should be as small as possible.

Thus, if an emitting surface is irradiated by electromagnetic energy, or according to modern terminology is subjected to bombardment by photons, the temperature of the surface will rise and the emission will increase by a detectable amount to an electric variable capable of amplification.

In the drawing, I have disclosed a preferred embodiment of incorporating my invention. In Figs. 1 and 2, I disclose the container 10 having a special heat transmitting window 11 out of a material such as fluorite or rock salt cemented on with silver chloride 12.

In order to obtain a quick efficient element for the cathode, I prefer to use for the active portion of the cathode a very thin ribbon. This ribbon portion is preferably obtained by heating a conductor such as 13 and flattening a portion 14 at the center. This flat portion 14 will be of such a thinness that the heat capacity thereof is negligible and hence the changes of its thermal condition will be very rapid. At the same time, loss of heat by conduction from the center will be minimized.

I prefer to confine the sensitive electron emitting area to a small spot or area 15 at the center of one side of this cathode. This sensitive spot may be a coating containing some very sensitive electron emitting material containing, for example, barium and the like. By confining the effective emitting area to the center, the total emission is enormously reduced while the rate of change of emission is increased with the temperature change occurring only at the center. The other side 17 of the active cathode ribbon I prefer to blacken with the use of any desired substance such as platinum black. The purpose of this is to absorb the largest possible fraction of the incident radiation.

It is also desirable to concentrate the radiant energy on this cathode, and I prefer to make use of an optical device such as a reflector which may preferably have a parabolic shape. I prefer to utilize the anode 18 to provide such a reflector for the radiant energy to the cathode as disclosed in Figs. 1 and 2. This anode may be supported by any standard such as 19 to a position adjacent the cathode and preferably substantially enclosing the side 16 having the sensitized area 15 thereon.

In order to secure maximum stability of operation, I propose to use an additional identical cathode and anode 14' and 18' in a single evacuated container 10 and to use the normal emission of the one to balance the normal emission of the other, whereby the differential output when one is irradiated is to be the signal for amplification.

In Fig. 5 is disclosed a preferred circuit for the device illustrated in Figs. 1 and 2. The filaments 14 and 14' are illustrated connected to the secondaries 20 and 21 of a transformer 22 providing the heating current. The resistances 23 and 24 may be adjusted to compensate for slight differences in emission characteristics. The circuit is balanced and then one of the cathodes, for example, 14, is exposed to the radiant energy to be detected or measured and the other cathode is masked therefrom. The radiant energy will increase the temperature of the cathode 14 and will result in an increase in the emission current that must return through the filament itself and thus still further increase the emission. This will continue until equilibrium with the radiated energy occurs. It is apparent that the change in emission current should be an appreciable fraction of the heating current in order to regenerate to a high degree. For this reason, I have designed the filament as previously described so as to require the least possible heating current compatible with its function and with that of an absorber, I prefer too that the cylindrical wire leads should be roughly seven times in diameter the thickness of the circular target. Thus the structure will all tend to rise to a common temperature with a minimum surface of radiation. While I prefer the cathode shaped as illustrated, the cathode might take such shapes as an indirectly heated disk or even a fine round wire. In general, the cathode should be a target to absorb as much radiant energy as possible. For sensitivity, the work function should be as small as possible and the emitting surface small in area in comparison with the target area of the cathode.

The increase in voltage across the resistance 25 will be the increase due to the receipt of radiant energy. The output terminals 26 and 27 may be connected to an indicator or calibrated measuring meter.

While I have disclosed a preferred embodiment of my invention, it is apparent that many changes can be made therein without departing from the spirit of the invention. Accordingly, I desire only such limitations to be imposed upon the following claims as are necessitated by the prior art.

I claim as my invention:

1. A discharge device comprising a cathode and an anode, said cathode comprising a thin ribbon having a sensitized spot spaced from the edges of the ribbon, said anode being curved with a portion of the cathode as substantially a focus.

2. A discharge device comprising an anode and cathode, said cathode having a blackened area exposed to radiant energy, said anode partly enclosing said cathode and being curved with a portion of the cathode as substantially a focus.

3. A discharge device comprising an anode and cathode, said cathode having a blackened area exposed to radiant energy, said anode partly enclosing said cathode and being curved with a portion of the cathode as substantially a focus, said cathode having a sensitized area adjacent said anode.

4. A discharge device comprising a flat filament with an exposed blackened surface on one side, an anode with a reflector shape substantially enclosing the other side of said filament, said other side of said filament having a sensitive coating thereon.

5. A discharge device comprising a cathode and an anode, said cathode comprising end portions connected by a ribbon portion which is very much thinner than said end portions, said ribbon portion having a sensitized spot spaced from the edges of the ribbon portion.

6. A cathode for a discharge device comprising end portions connected by a ribbon portion which is very much thinner than said end portions, said ribbon portion having a sensitized spot spaced from the edges on one side thereof and having the other side blackened.

EARL D. WILSON.